(12) United States Patent
Nedzlek et al.

(10) Patent No.: US 9,028,178 B2
(45) Date of Patent: May 12, 2015

(54) MULTI-EFFECTIVE MATERIAL REMOVAL TOOL

(75) Inventors: Kevin Nedzlek, Howell, MI (US); Richard S. Green, Lapeer, MI (US)

(73) Assignee: Sandvik, Inc., Fair Lawn, NJ (US)

( * ) Notice: Subject to any disclaimer, the term of this patent is extended or adjusted under 35 U.S.C. 154(b) by 608 days.

(21) Appl. No.: 13/381,707

(22) PCT Filed: Jun. 23, 2010

(86) PCT No.: PCT/US2010/039623
§ 371 (c)(1),
(2), (4) Date: Mar. 6, 2012

(87) PCT Pub. No.: WO2011/002648
PCT Pub. Date: Jan. 6, 2011

(65) Prior Publication Data
US 2012/0155977 A1    Jun. 21, 2012

Related U.S. Application Data

(60) Provisional application No. 61/221,602, filed on Jun. 30, 2009.

(51) Int. Cl.
*B23B 41/12*    (2006.01)
*B23B 51/08*    (2006.01)
(Continued)

(52) U.S. Cl.
CPC .............. *B23C 3/05* (2013.01); *Y10T 408/9065* (2015.01); *Y10T 408/906* (2015.01); *Y10T 408/03* (2015.01); *Y10T 408/94* (2015.01); *Y10T 408/5587* (2015.01); *B23D 77/14* (2013.01)

(58) Field of Classification Search
CPC ................................ B23B 41/12; B23B 51/08

USPC ........................ 408/145, 83.5, 201, 223–225
See application file for complete search history.

(56) References Cited

U.S. PATENT DOCUMENTS 1,592,092 A * 7/1926 Forster ......................... 408/83.5
1,667,218 A * 4/1928 Purnis ......................... 408/83.5
(Continued)

FOREIGN PATENT DOCUMENTS

DE   102006016290 A1 * 10/2007 ............. B23D 77/14
FR   2 927 555        8/2009
(Continued)

OTHER PUBLICATIONS

Notification of the First Office Action (with English translation) for Chinese Patent Application No. 201080033897.8, dated Jul. 3, 2013.
(Continued)

*Primary Examiner* — Daniel Howell
*Assistant Examiner* — Nicole N Ramos
(74) *Attorney, Agent, or Firm* — Morgan, Lewis & Bockius LLP

(57) ABSTRACT

Material removal tool (100), such as for forming surfaces of valve seats, includes an integral or separable reduced diameter circumferential insert housing (106) including a plurality of inserts (120) bonded thereto. The plurality of inserts (120) include cutting surfaces (122) at different axial and radial positions relative to the axis (112) of the material removal tool (100). Cutting surfaces (122) at different axial and radial positions are arranged at different angles to the axis (112), and at least one cutting surface (122) on at least one insert is at an angle of about 45 degrees relative to the axis (112). Cutting surfaces (122) can be located on one insert-type or different insert-types and can have different combinations of cutting surfaces (122). When arranged circumferentially on the insert housing (106), a N-effective material removal tool (100) is formed. Methods of machining using the N-effective material removal tool (100) is also disclosed.

26 Claims, 7 Drawing Sheets

(51) Int. Cl.
*B23C 3/05* (2006.01)
*B23D 77/14* (2006.01)

(56) References Cited

U.S. PATENT DOCUMENTS

| | | | | |
|---|---|---|---|---|
| 1,846,890 | A * | 2/1932 | Miller | 408/83.5 |
| 2,102,707 | A * | 12/1937 | Holhut | 408/83.5 |
| 3,018,675 | A * | 1/1962 | Klages et al. | 408/189 |
| 3,433,104 | A * | 3/1969 | Milewski et al. | 408/156 |
| 4,545,706 | A * | 10/1985 | Hiroyasu et al. | 408/1 BD |
| 4,586,858 | A | 5/1986 | Kubota | |
| 4,930,948 | A * | 6/1990 | Bowen | 408/190 |
| 5,265,988 | A * | 11/1993 | Schmigalla et al. | 408/225 |
| 5,516,243 | A * | 5/1996 | Laube | 408/239 R |
| 5,542,795 | A * | 8/1996 | Mitchell | 407/35 |
| 5,816,753 | A * | 10/1998 | Hall | 408/224 |
| 6,004,081 | A * | 12/1999 | Hellstrom et al. | 407/103 |
| 6,315,064 | B1 | 11/2001 | Massa et al. | |
| 6,325,575 | B1 * | 12/2001 | Pawlik | 408/83.5 |
| 6,379,088 | B1 * | 4/2002 | Gruber et al. | 408/83.5 |
| 7,163,362 | B2 * | 1/2007 | Keightly | 408/204 |
| 7,717,651 | B2 * | 5/2010 | Haberle et al. | 408/24 |
| 2004/0247405 | A1 | 12/2004 | Keightley | |
| 2007/0081871 | A1 * | 4/2007 | Cirino | 408/239 R |

FOREIGN PATENT DOCUMENTS

| | | | |
|---|---|---|---|
| JP | 05092308 A | * | 4/1993 |
| JP | 2005074581 A | * | 3/2005 |

OTHER PUBLICATIONS

Second Office Action (and English translation) for Chinese Application No. 201080033897.8, dated Feb. 24, 2014.
Extended European Search Report for European Patent Application No. 10794562.8, dated Sep. 11, 2013.

* cited by examiner

MULTI-EFFECTIVE MATERIAL REMOVAL TOOL

RELATED APPLICATIONS

The present application is a U.S. National Phase Application of International Application No. PCT/US2010/039623 (filed 23 Jun. 2010) which claims priority to U.S. Provisional Application No. 61/221,602 (filed 30 Jun. 2009).

FIELD

The present disclosure relates to a material removal tool and machining with the material removal tool. In particular, the present disclosure relates to a material removal tool having N-effective cutting surfaces. In one application, the disclosure relates to a method of machining at least two surfaces of a valve seat simultaneously with a single material removal tool having a replaceable hub on which cutting inserts are mounted and relates to the material removal tool and replaceable hub per se.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Conventionally, valve seats in, for example, combustion engines, have three surfaces arranged at angles to each other. FIG. 1 schematically illustrates the surfaces of a conventional valve seat 10 in a workpiece 12, with a top surface 14, a joining surface 16 and a stem surface 18. The top surface 14, joining surface 16 and stem surface 18 complement surfaces of a valve 20 to seat the valve 20 in the valve seat 10 during operation of the combustion engine. Alternative conventional valve seats can have from two to four or more surfaces.

The conventional method to form a valve seat with more than one surface uses a single effective material removal tool where one insert or blade cuts one of the three valve seat surfaces. The one insert or blade is typically an indexable insert and is arranged at the preset angle to the one valve seat surface to be machined and then the cutting operation is conducted. To machine the valve seat surfaces, a different insert edge, a different insert or even a different tool is brought into engagement with the workpiece to machine one of the remaining valve seat surfaces. This operation is repeated for each distinct valve seat surface. Using different tools, a single effective tool, and/or having to index or change indexable inserts can introduce angular errors into the part. However, tolerances on parts such as valve stem seating surfaces are very tight, and the conventional tools and methods of machining can introduce errors beyond those tolerated in specifications for such parts.

SUMMARY

An exemplary embodiment of a material removal tool comprises a mating structure for attaching the material removal tool to a spindle of a machine tool, a reduced diameter circumferential insert housing including a plurality of inserts bonded thereto, a holder, and a reamer positioned in the holder and longitudinally extending therefrom along an axis of the material removal tool, wherein the mating structure, the reduced diameter circumferential insert housing, the holder and the reamer are arranged axially along the axis with the mating structure at a rearwardmost end and the reamer at the forwardmost end, wherein the plurality of inserts include cutting surfaces at different axial positions relative to the axis of the material removal tool and at different radial positions relative to the axis of the material removal tool, wherein the cutting surfaces at different axial and radial positions are arranged at different angles to the axis, and wherein at least one cutting surface on at least one insert is at an angle of about 45 degree relative to the axis.

An exemplary embodiment of a reduced diameter circumferential insert housing comprises a body with a bore, a plurality of inserts bonded thereto at a circumferential position of the body, wherein the plurality of inserts include cutting surfaces at different axial positions relative to an axis or the bore and at different radial positions relative to the axis of the bore, wherein the cutting surfaces at different axial and radial positions are arranged at different angles to the axis, and wherein at least one cutting surface on at least one insert is at an angle of about 45 degree relative to the axis.

An exemplary embodiment of a method to remove material from a workpiece comprises rotating a material removal tool mounted to a spindle of machine tool, inserting a reamer into a guidehole of the workpiece, and removing material from the workpiece by contacting a plurality of inserts of the material removal tool to the workpiece, wherein the material removal tool includes: a mating structure for attaching the material removal tool to the spindle of the machine tool, a reduced diameter circumferential insert housing including the plurality of inserts bonded thereto, and a holder, the reamer positioned in the holder and longitudinally extending therefrom along an axis of the material removal tool, wherein the mating structure, the reduced diameter circumferential insert housing, the holder and the reamer are arranged axially along the axis with the mating structure at a rearwardmost end and the reamer at the forwardmost end, wherein the plurality of inserts include cutting surfaces at different axial positions relative to the axis of the material removal tool and at different radial positions relative to the axis of the material removal tool, wherein the cutting surfaces are arranged at different angles to the axis, and wherein at least one cutting surface on at least one insert is at an angle of about 45 degree relative to the axis.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which:

FIG. 6 is a first embodiment with three insert-types each having a single cutting surface as shown in FIGS. 7-9; FIG. 10 is a second embodiment with two insert-types, one type with a single cutting surface and a second type with two cutting surfaces as shown in FIGS. 11-12. FIG. 13 is an alternative embodiment of the insert-type with two cutting surfaces.

DETAILED DESCRIPTION

Exemplary embodiments of a material removal tool, uses bonded inserts to form a material removal tool with a plurality of effective cutting positions, for example, five effective or six effective cutting positions. By using different insert-types, i.e., an insert-type has a commonly positioned and angled cutting surface or surfaces, relative to the axis of the material removal tool, located at different cutting positions on the material removal tool, a finished, multi-surfaced product can be formed that uses one or more of straight, radiused or blended angles at the intersections of the surfaces. Further, the housing for the cutting inserts can be integrally formed with the body of the material removal tool or be separable therefrom. A separable housing for the cutting inserts allows for changing the housing, and the inserts bonded thereon, without changing the material removal tool or removing the material removal tool from a spindle of a machine tool and improves flexibility and efficiency of machining operations. The disclosed material removal tool has particularly application for the machining of valve seats, but other material removal tool operations can be conducted using the material removal tool.

Figure 1:
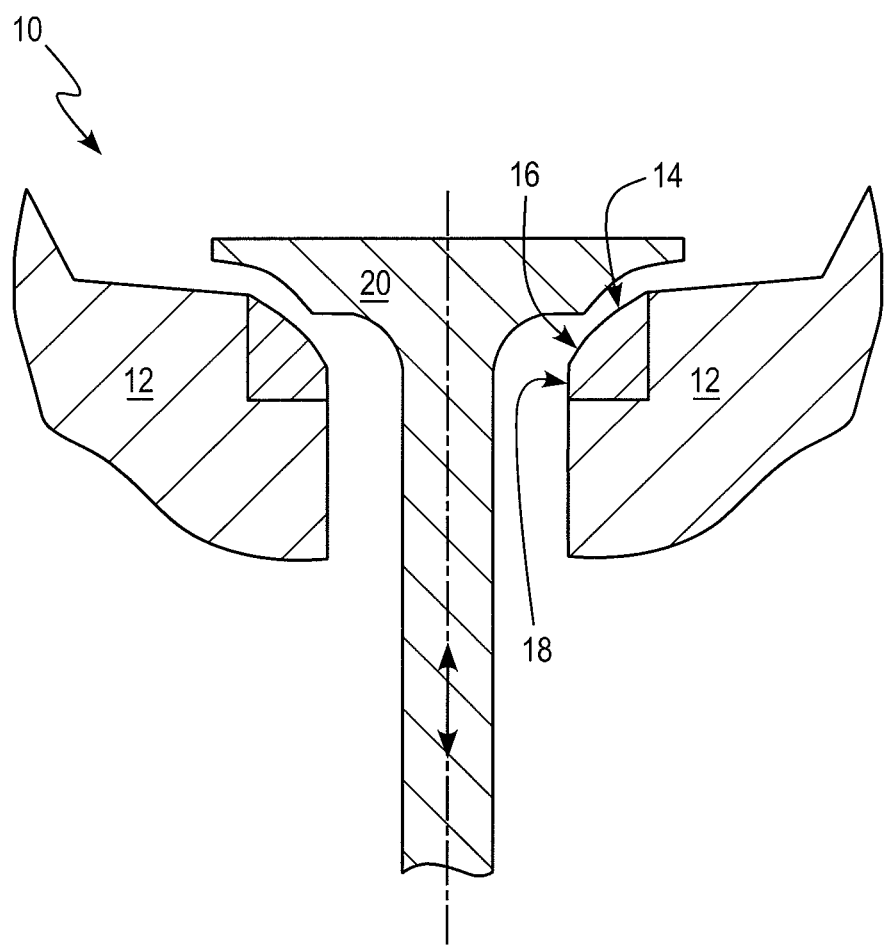
FIG. 1 schematically illustrates the surfaces of a conventional valve seat.
Figure 2:
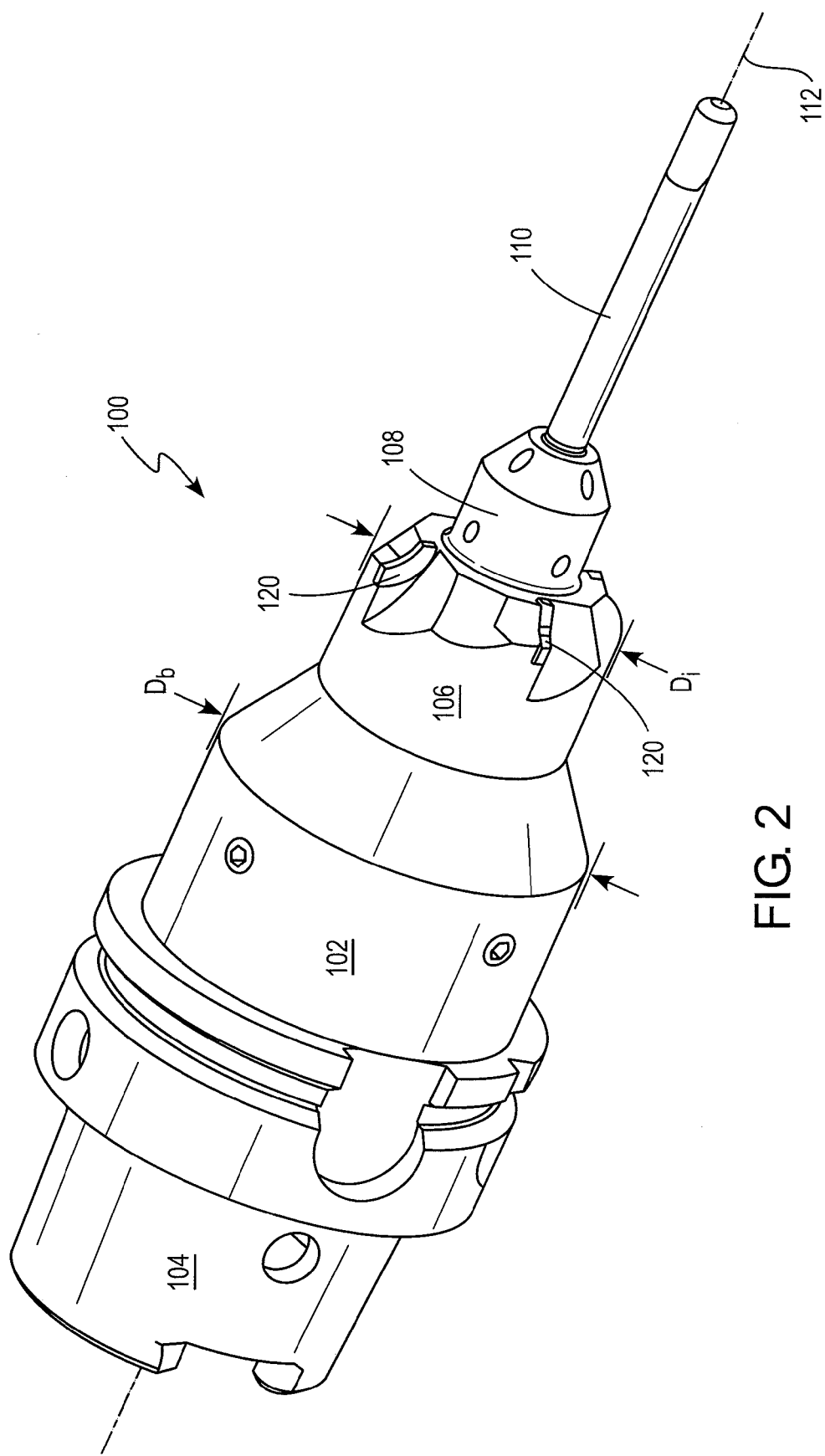
FIG. 2 illustrates an exemplary embodiment of a material removal tool with an integrally formed insert housing.

FIG. 2 illustrates an exemplary embodiment of a material removal tool with an integrally formed insert housing. In the illustrated embodiment, the material removal tool 100 comprises a body 102 with a mating structure 104, a reduced diameter circumferential insert housing 106, a holder 108, and a reamer 110. The mating structure 104, the reduced diameter circumferential insert housing 106, the holder 108 and the reamer 110 are arranged axially along an axis 112 with the mating structure 104 at a rearwardmost end and the reamer 110 at the forwardmost end. The plurality of inserts 120 are positioned circumferentially, e.g., around the circumference, on the insert housing 106, as shown and described in various embodiments herein.

The mating structure 104 is at a first axial end of the body 102 of the material removal tool 100 and attaches the material removal tool 100 to a spindle of a machine tool (not shown). The mating structure 104 can take any suitable form that allows attachment to the spindle of a desired machine tool. As an example, the mating structure 104 can include the arrangement of features necessary to attach to a machine tool, such as a HAAS VF6 milling machine, during operation.

At a second axial end of the body 102 is a reduced diameter circumferential insert housing 106. The diameter ($D_i$) of the insert housing 106 is reduced in comparison to the diameter ($D_b$) of the body 102 and the insert housing 106 is circumferential in that the plurality of inserts 120 are located on the circumference of the radial cross-section of the insert housing 106. The plurality of inserts 120 are themselves bonded to the insert housing 106. In one exemplary embodiment, the plurality of inserts 120 are bonded by brazing. Other suitable bonding techniques can be used, for example, adhesives and welding. Brazing and other bonding methods allow a rough shaped insert to be mounted to the insert housing 106 and then subsequently shaped in place. For example, a brazed insert can be wire cut, ground and/or honed to a final shape while installed in place on the insert housing 106.

In exemplary embodiments, the plurality of inserts are formed from a composition that includes cemented carbide or cubic boron nitride. However, other hard materials can be used as desired for the cutting application.

The holder 108 is positioned axially forward of the insert housing 106 and accommodates the reamer 110 such that the reamer 110 longitudinally extends therefrom along the axis 112 of the material removal tool 100. The holder 108 allows removable attachment of the reamer to the material removal tool 100. Examples of suitable holders include a chuck, one example of which is a collet, or a shrink fit holder or the like.

Figure 3:
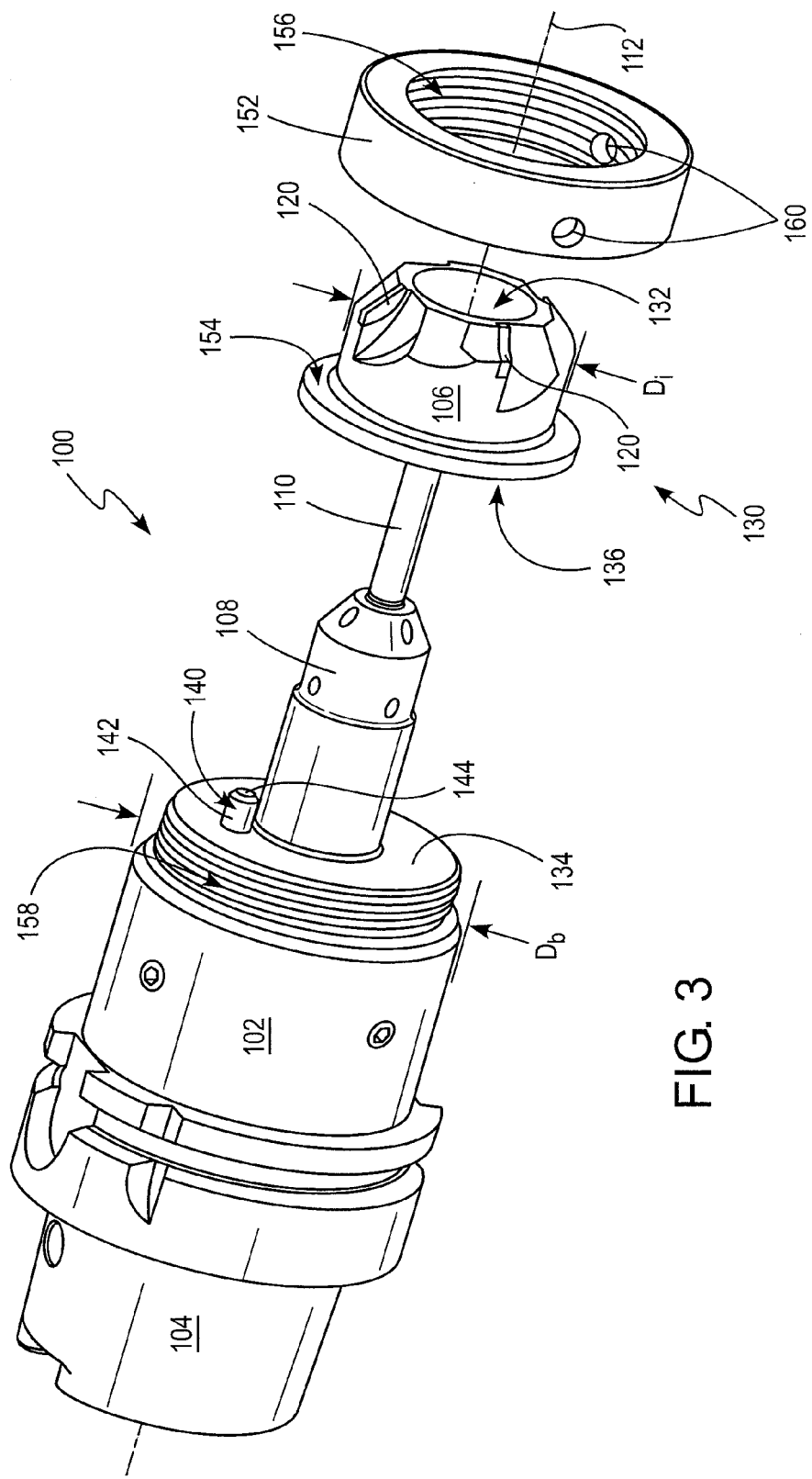
FIG. 3 illustrates another exemplary embodiment of a material removal tool with an insert housing that is separable from a body of the tool.

The material removal tool 100 can have an integrally formed insert housing 106, as shown and described in connection with the exemplary embodiment of FIG. 2, or the material removal tool 100 can have an insert housing 106 that is separable from body 102. FIG. 3 illustrates an exemplary embodiment of a material removal tool 100 with an insert housing 106 that is separable from a body 102 of the tool 100. In the illustrated example, the separable insert housing 106 is in the form of a hub 130 and includes bore 132 or other opening that is positioned over the holder 108 and mated to the body 102. The respective mating surfaces 134, 136 of the body 102 and the hub 130 are complementary to each other. On the body 102, the mating surface 134 is, for example, a radially extending surface. Likewise, the complementary mating surface 136 on the hub 130 is, for example a radially extending surface.

Optionally, the complementary mating surfaces 134, 136 can incorporate complementary features on the mating surfaces. These complementary features can be in any suitable form, for example, a pilot, ridges and grooves, or serrations. The complementary features assist in positioning the hub 130 on the material removal tool 100 and prevent rotation of the hub 130 relative to the material removal tool 100. The complementary features bear a majority, if not all, of the forces generated when the material removal tool 100 is operated to removal material from a workpiece by contacting a plurality of the inserts 120 to the workpiece. FIG. 3, illustrates an example of a complementary feature as a pilot 140. The pilot 140 is on the mating surface 134 of the body 102 and projects axially forward. The hub 130 has a complementary receiving feature (not shown) on its mating surface 136 to receive the pilot 140. Alternatively, the mating surface 136 of the hub 130 can have the pilot and the mating surface 134 of the body 102 can have the receiving feature. An exemplary pilot 140 can have an inward taper from a base end 142 to a distal end 144.

A holding device or other biasing means, such as nut 152, can be positioned over the holder 108 and the hub 130. The nut 152 contacts a circumferential portion 154 of the radially extending surface of the hub 130 and places a compressive preload on the mating surfaces 134, 136 of the hub 130 and the body 102. In the embodiment illustrated in FIG. 3, the nut 152 has internal threads 156 and is threaded onto threads 158 on the body 102. Holes 160 in the nut 152 accommodate a tightening device, such as a spanner wrench, to apply a tightening torque.

Figure 4:
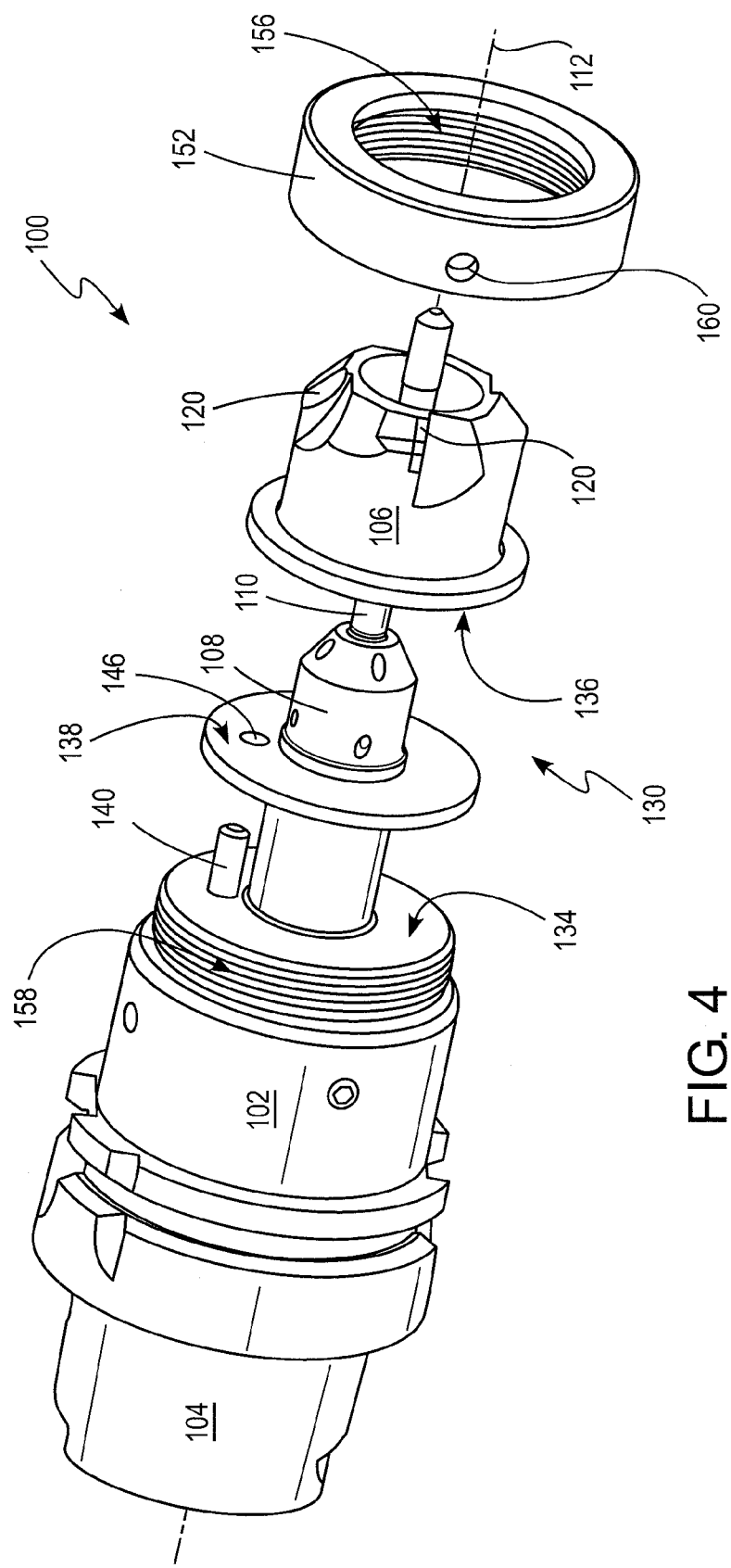
FIG. 4 illustrates a further exemplary embodiment of a material removal tool with an insert housing that is separable from a body of the tool.

The use of a separable hub 130 allows easy exchange between hubs with different inserts, insert-types, or different hub shapes. A separable hub 130 allows for exchange between different hubs without removing the material removal tool 100 from the spindle of the machine tool. When removed, the inserts 120 on the separable hub 130 can be reconditioned for subsequent use. Typically, one can recondition the inserts 120 by regrinding the cutting surfaces 122 on the individual inserts several times, for example two to three times, before too much of the insert 120 has been removed and reconditioning is no longer practical. When the inserts 120 are reconditioned, the axial position of the cutting surfaces 122 can change. When remounted on a material removal tool 100, the axial position of the cutting surfaces 122 can be restored to their approximate original position by using one or more spacers 138 located between the mating surfaces 134, 136 of the hub 130 and the body 102. An example of a spacer 138 is a washer. FIG. 4 illustrates a further exemplary embodiment of a material removal tool with an insert housing that is separable from a body of the tool. The FIG. 4 embodiment is substantially similar to the embodiment shown and described in connection with FIG. 3, but in addition illustrates the spacer 138 located between the mating surfaces 134, 136 of the hub 130 and the body 102. The spacer 138 can incorporate the complementary features of the mating surfaces 134, 136, e.g., a pilot, ridges and grooves, or serrations. In FIG. 4, the spacer 138 has an opening 146 through which the pilot 140 can pass.

The plurality of inserts 120 can have various combinations of cutting surfaces 122 and be located at various circumferential positions on the reduced diameter insert housing 106. The example herein describes cutting surfaces 122 arranged to form the seating surfaces of a valve seat, including a top surface, a stem surface and a joining surface.

A first example of cutting surfaces 122 is illustrated in FIGS. 2 and 3. Here, each insert includes, or alternatively, consists essentially of, three cutting surfaces 122a, 122b, 122c. The cutting surfaces are at different axial positions $P_1$, $P_2$, $P_3$ relative to the axis 112 of the material removal tool 100 and at different radial positions $R_1$, $R_2$, $R_3$ relative to the axis 112 of the material removal tool 100. The cutting surfaces 122a, 122b, 122c at the different axial and radial positions are arranged at different angles $\theta_1$, $\theta_2$, $\theta_3$ to the axis 112.

Figure 5:
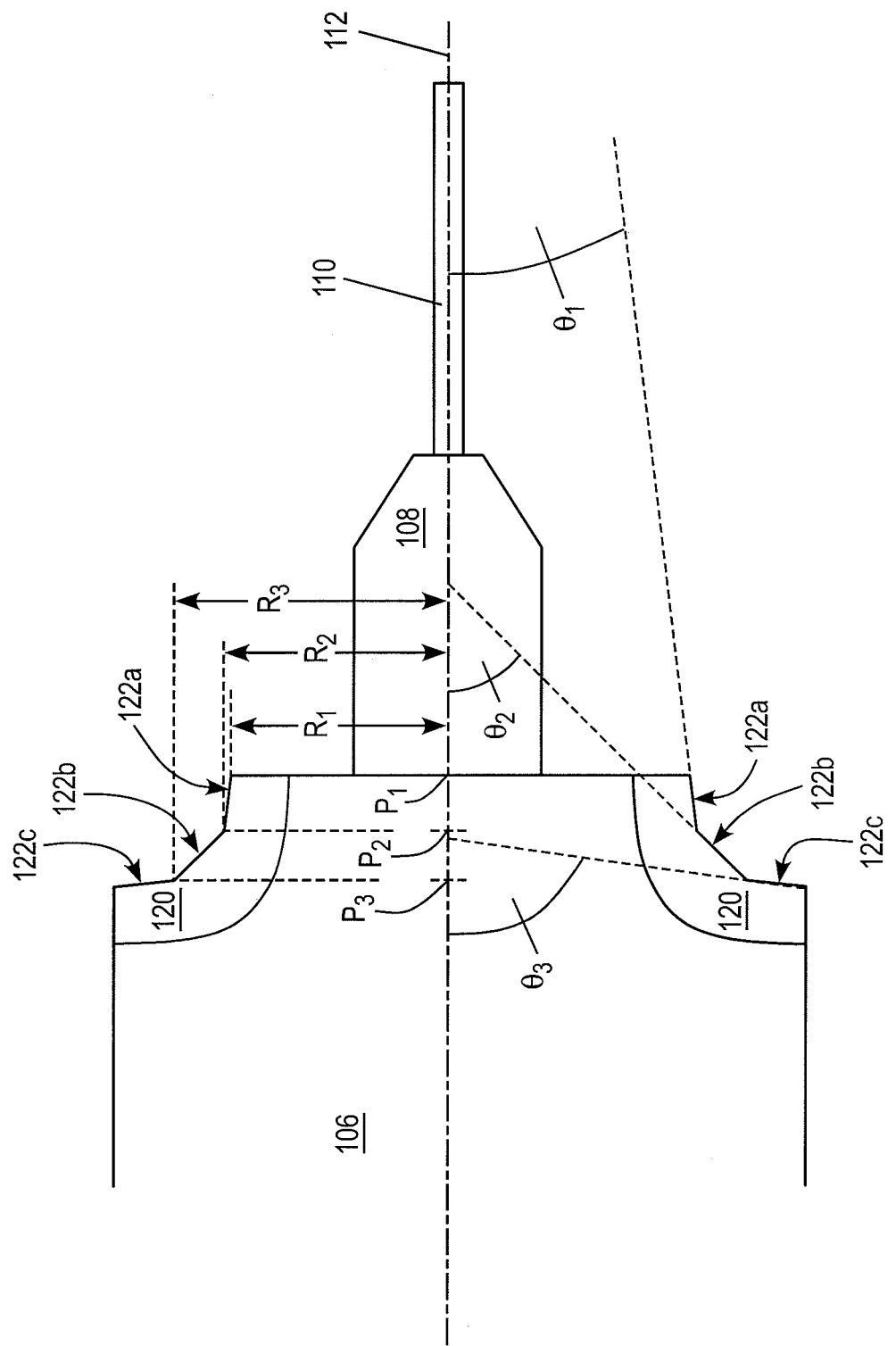
FIG. 5 is a schematic showing, relative to the axis of the material removal tool, generic examples of the radial and axial position of cutting surfaces of the insert and the angles of the cutting surface.

FIG. 5 is a schematic showing, relative to the axis of the material removal tool, generic examples identifying the radial and axial position of cutting surfaces of the insert and the angles of the cutting surface. Considering the axial distribution of the cutting surfaces, the plurality of inserts 120 include cutting surfaces 122a, 122b, 122c at different axial positions ($P_1$, $P_2$, $P_3$) relative to the axis 112 of the material removal tool 100. The axial position is determined from the axially forwardmost position of the individual cutting surface, as shown in FIG. 5. Accordingly for the example shown, the individual cutting surfaces can be associated with a forwardmost cutting surface, i.e., cutting surface 122a at axial position $P_1$, a rearwardmost cutting surface, i.e., cutting surface 122c at axial position $P_3$, and a cutting surface positioned, relative the axis, axially between the forwardmost cutting surface and the rearwardmost cutting surface, i.e., cutting surface 122b at axial position $P_2$. Considering the radial distribution of the cutting surfaces, cutting surfaces 122a, 122b, 122c of the plurality inserts 120 are at different radial positions ($R_1$, $R_2$, $R_3$) relative to the axis 112 of the material removal tool 100. The radial position is determined from the radially innermost position of the individual cutting surface, as shown. Accordingly for the example shown in FIG. 5, the individual cutting surfaces can be associated with an innermost cutting surface, i.e., cutting surface 122a at radial position $R_1$, an outermost cutting surface, i.e., cutting surface 122c at radial position $R_3$, and a cutting surface positioned, relative the axis, radially between the innermost cutting surface and the outermost cutting surface, i.e., cutting surface 122b at radial position $R_2$.

Further, the cutting surfaces 122a, 122b, 122c at different axial and radial positions are arranged at different angles to the axis 112 of the material removal tool 100. The angle ($\theta_1$, $\theta_2$, $\theta_3$) to the axis 112 is determined from the intersection of the projection of the plane containing the individual cutting surface with the line of the axis 112, as shown in FIG. 3. Accordingly for the example shown in FIG. 5, the cutting surface 122a at axial position $P_1$ and radial position $R_1$, has an angle $\theta_1$; the cutting surface 122b at axial position $P_2$ and radial position $R_2$, has an angle $\theta_2$; and the cutting surface 122c at axial position $P_3$ and radial position $R_3$, has an angle $\theta_3$.

In FIGS. 2 and 3, there are six inserts 120 and each insert has identical positions and angles of the cutting surfaces. Alternative embodiments can use more or less than six inserts arranged circumferentially, such as three, four, five and seven and eight inserts. Depending on the number (N) of inserts used, the tool 100 can be identified as an "N-effective" material removal tool. Generally, the larger the number (N) of inserts, the longer the service life for each insert.

In exemplary embodiments and as shown in FIGS. 2 and 3, the cutting surfaces are all arranged on a single insert 120, with cutting surface 122b contiguous with cutting surface 122a at a first end and contiguous with cutting surface 122c at a second end.

Figure 6:
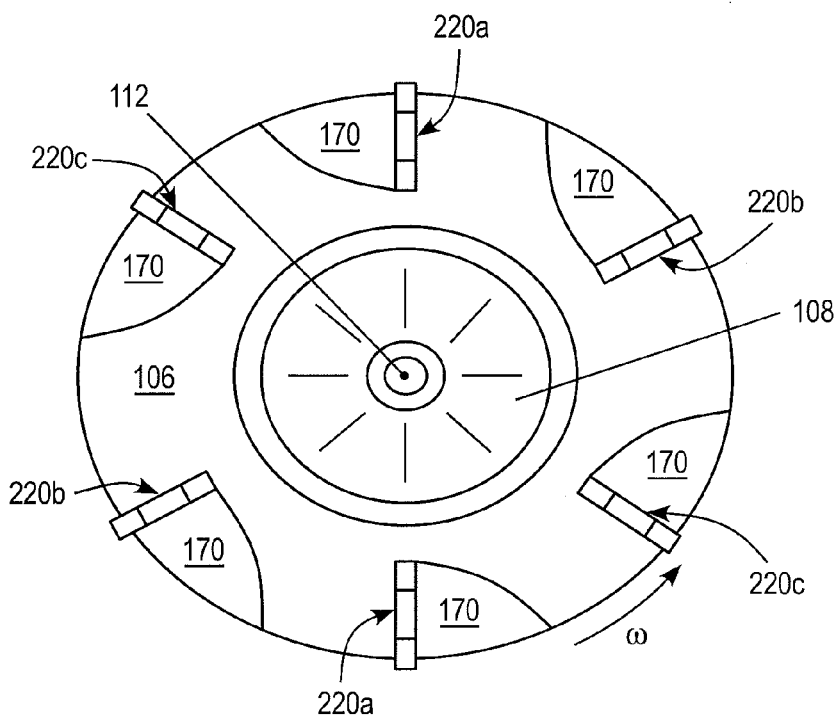
FIGS. 6 to 13 illustrate additional alternative embodiments for the inserts mounted on the insert housing.
Figures 7, 8, 9:
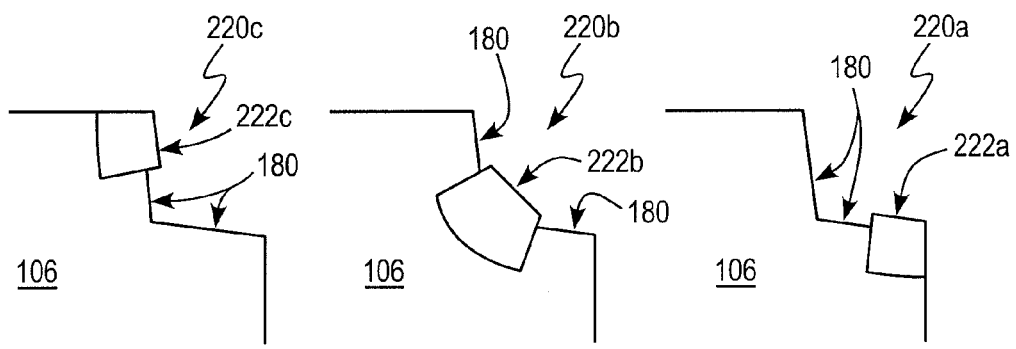
Figure 10:
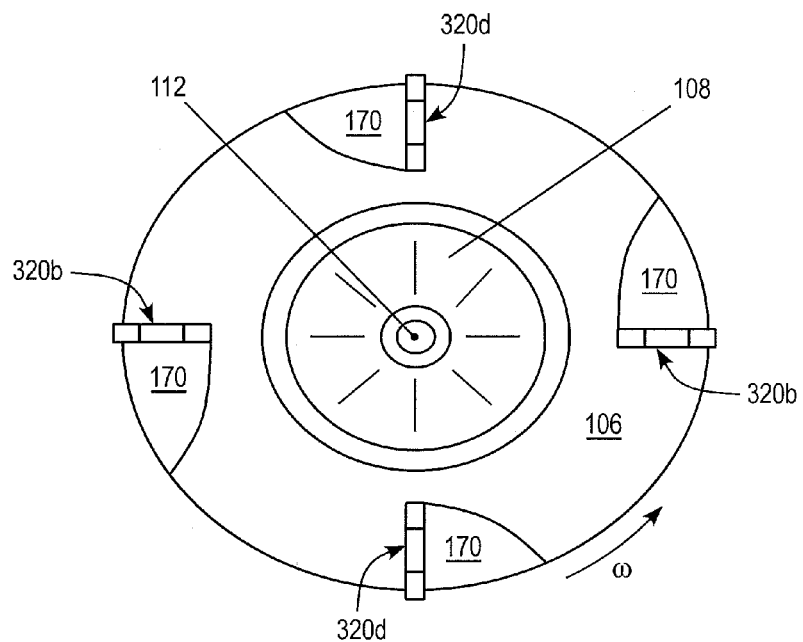
Figures 11, 12, 13:
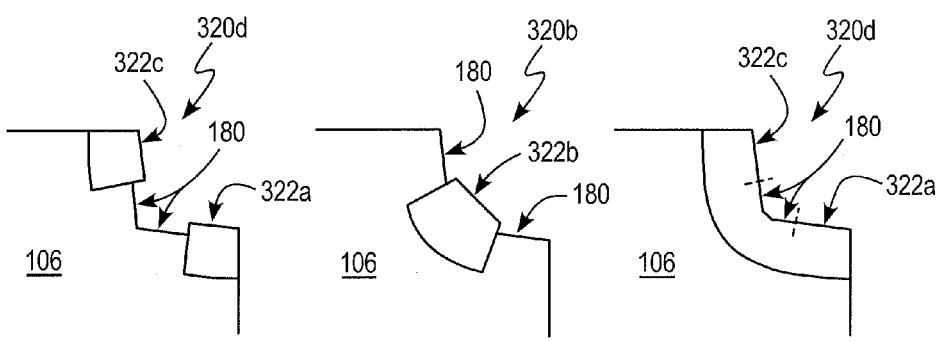

FIGS. 6 and 10 (and there associated magnified views FIGS. 7-9 and FIGS. 11-13, respectively) illustrate two additional alternative embodiments for the type of inserts 120 mounted on the insert housing 102. FIG. 6 is a first embodiment with three insert-types as shown in FIGS. 7-9 each having a single cutting surface; FIG. 10 is a second embodiment with two insert-types as shown in FIGS. 11-12, one type with a single cutting surface and a second type with two cutting surfaces. FIG. 13 is an alternative embodiment of the insert-type with two cutting surfaces.

With reference to FIGS. 6-9, FIG. 6 is a plan view of a portion of the material removal tool as seen axially, i.e., parallel to the axis 112. For reference, shown in FIG. 6 is the reduced diameter insert housing 106 and the holder 108. The holder 108 is shown without a reamer. No specific form of the reduced diameter insert housing 106 is depicted, and the noted features can be applied to both the integrally formed insert housing and the separable insert housing. The embodiment shown in FIG. 6 has three insert-types 220a, 220b, 220c arranged circumferentially on the insert housing 106. The insert-types are staggered about the circumference of the insert housing 106 with the same insert-type being non-sequential circumferentially. Each insert has an associated pocket 170 for efficient machining.

The three insert-types are distinguished one from the other by the cutting surfaces thereon as shown in FIGS. 7-9 in which a first insert-type 220a is shown in FIG. 67, a second insert-type 220b is shown in FIG. 8 and a third insert-type 220c is shown in FIG. 9. In each of FIGS. 7-9, the insert and cutting surfaces are shown in plan view as seen radially, i.e., perpendicular to the axis 112. In this embodiment, each insert-type 220a, 220b, 220c has a single cutting surface 222a, 222b, 222c, respectively, that is at a different axial and radial position relative to the axis 112. Generally, the cutting surface 222a, 222b, 222c on each insert-type 220a, 220b, 220c has the axial and radial position relative to the axis 112 of the material removal tool as for analogously positioned cutting surfaces 122a, 122b, 122c shown and described, for example, with respect to FIGS. 2 through 5.

Although the single cutting surfaces 222a, 222b, 222c are at different axial and radial positions, when the material removal tool rotates (a) during operation, the single cutting surfaces 222a, 222b, 222c rotate past the machining point in a manner that combine their machining effect to remove material from the workpiece to form one structure, such as the top surface, joining surface and stem surface of a valve seat. To prevent interference from adjoining surfaces 180 of the inserts 220a, 220b, 220c from interfering with the cutting surfaces 222a, 222b, 222c, the cutting surfaces 222a, 222b, 222c are extended relative to the adjoining surfaces 180 to provide clearance between the adjoining surfaces 180 and the corresponding surface of the workpiece that is being machined by one of the other cutting surfaces on a different insert-type.

With reference to FIGS. 10-13, FIG. 10 is a plan view of a portion of the material removal tool as seen axially, i.e., parallel to the axis 112. For reference, shown in FIG. 10 is the reduced diameter insert housing 106 and the holder 108. The holder 108 is shown without a reamer. No specific form of the reduced diameter insert housing 106 is depicted, and the noted features can be applied to both the integrally formed insert housing and the separable insert housing. The embodiment shown in FIG. 10 has two insert-types 320d, 320b arranged circumferentially on the insert housing 106. The insert-types are staggered about the circumference of the insert housing 106 with the same insert-type being non-sequential circumferentially. Each insert has an associated pocket 160 for efficient machining.

The two insert-types are distinguished one from the other by the cutting surfaces thereon as shown in FIGS. 11-12 in which a first insert-type 320d is shown in FIG. 11 and a second insert-type 320b is shown in FIG. 12. As previously stated, FIG. 13 is an alternative embodiment of the first insert-type 320d with two cutting surfaces. In each of FIGS. 11-13, the insert and cutting surfaces are shown in plan view as seen radially, i.e., perpendicular to the axis 112. In this embodiment, each insert-type 320d has two cutting surfaces 322a, 322c, respectively, that are each at a different axial and radial position relative to the axis 112. Additionally, each insert-type 320b has a single cutting surface 322b that is at a different axial and radial position relative to the axis 112 than any of the cutting surfaces 322a, 322c on the first insert-type 320d. Generally, the cutting surface 322a, 322b, 322c on each insert-type 320b, 320d has the axial and radial position relative to the axis 112 of the material removal tool as for analogously positioned cutting surfaces 122a, 122b, 122c shown and described, for example, with respect to FIGS. 2 through 5, but in this embodiment, the two cutting surfaces 122a and 122c are combined on one insert 320d.

Although the cutting surfaces 322a, 322b, 322c are at different axial and radial positions, when the material removal tool rotates (ω) during operation, the cutting surfaces 322a, 322b, 322c rotate past the machining point in a manner that combine their machining effect to remove material from the workpiece to form one structure, such as the top surface, joining surface and stem surface of a valve seat. To prevent interference from adjoining surfaces 180 of the inserts 320d, 320b from interfering with the cutting surfaces 322a, 322b, 322c, the cutting surfaces 322a, 322b, 322c are extended relative to the adjoining surfaces 180 to provide clearance between the adjoining surfaces 180 and the corresponding surface of the workpiece that is being machined by one of the other cutting surfaces on a different insert-type.

The two cutting surfaces 322a, 322c on the one insert 320d can be separate structures as shown in FIG. 11 or can be on one insert structure as shown in FIG. 13. In FIG. 13, the dashed lines intersecting the cutting surfaces show a hypothetical location where the radial and axial positions of the cutting surfaces are such that the cutting surface 322b dominates. In other words, the cutting surface on insert 320d between the dashed lines does not contact the workpiece during machining operations and, rather, the cutting surface 322b on insert 320b contacts the workpiece. In both embodiments, the cutting surfaces 320a, 320c overlap radially with the cutting surface 322b on insert 320b.

Although described herein in connection with FIGS. 10-13 that the cutting surface 322b is on a separate insert 320b, and the cutting surfaces 322a, 322c are on a separate insert 320d, modifications and adjustments to this arrangement can be made to form additional embodiments. For example, cutting surfaces 322b and one of 322a 322c can be on the same insert with the other of cutting surface 322c and 322a by itself on a separate insert, e.g., cutting surfaces 322b and 322a can be on the same insert or cutting surfaces 322b and 322c can be on the same insert.

For an exemplary valve seat application, at least one cutting surface on at least one insert is at an angle of about 45 degree relative to the axis 112. Preferably, the at least one cutting surface at an angle of about 45 degree relative to the axis 112 is the cutting surface axially and radially between the axially forwardmost and radially innermost cutting surface 122a, 222a, 322a and the axially rearwardmost and radially outermost cutting surface 122c, 222c, 322c. This at least one cutting surface at an angle of about 45 degree relative to the axis 112 is identified as cutting surface 122b, 222b, 322c in the various embodiments herein and the about 45 degree angle relative to the axis 112 is $\theta_2$.

Placing the axially forwardmost and radially innermost cutting surface 122a, 222a, 322a and the axially rearwardmost and radially outermost cutting surface 122c, 222c, 322c, whether on separate insert-types 120a, 120c and 220a, 220c or on the same insert-type 320d, on a different insert than the cutting surface axially and radially therebetween 122b, 222b, 322b can be used to provide an advantageous meeting angle between the surfaces machined by the distinct cutting surfaces. For example, if the axially forwardmost and radially innermost cutting surface 122a, 222a, 322a and/or the axially rearwardmost and radially outermost cutting surface 122c, 222c, 322c overlap the cutting surface axially and radially therebetween 122b, 222b, 322b, for example the cutting surfaces extend past the effective intersection point therebetween, then the resulting angle formed in the workpiece by the meeting of the machined surfaces will be non-radiused. Alternative, if all of the cutting surfaces are on one insert, then the result of machining the inserts to form the cutting surfaces will leave a radiused angle at the intersection of the machined surfaces. This radiused angle can result, for example by using a cutting process such as electrical discharge machining (EDM), wherein the wire diameter prevents non-radiused angles from being formed. In valve stem applications, it may be advantageous for airflow during valve stem operation to incorporate one or more radiused angles.

Similar to FIG. 13, cutting surfaces 322 of inserts can be larger than just the surface that effectively cuts the workpiece. Further, inserts and the arrangement of cutting surfaces and are not limited to the geometries depicted herein. For example, an insert can have a combination of cutting surfaces and cutting surfaces 322 can overlap adjacent cutting surfaces 322.

The disclosed material removal tool can be used to machine a workpiece. In one exemplary embodiment, the material removal tool can be used to machine a valve seat. In an exemplary method to remove material from a workpiece, a material removal tool as disclosed herein is mounted to a spindle of machine tool and rotated. The reamer is inserted into a guidehole of the workpiece and material from the workpiece removed by contacting the plurality of inserts of the material removal tool to the workpiece.

When a separable insert housing is used, the insert housing can be exchanged while the material removal tool remains mounted on the spindle. In situations where the axial position of the inserts needs to be adjusted, for example, after reconditioning the cutting surfaces, an axial position of the reduced diameter circumferential insert housing can be adjusted by a spacer placed between mating surfaces of the reduced diameter circumferential insert housing and a body of the material removal tool.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A material removal tool, comprising:
   a mating structure for attaching the material removal tool to a spindle of a machine tool;
   a reduced diameter circumferential insert housing including a plurality of inserts bonded thereto;
   a holder; and
   a reamer positioned in the holder and longitudinally extending therefrom along an axis of the material removal tool,
   wherein the mating structure, the reduced diameter circumferential insert housing, the holder and the reamer are arranged axially along the axis with the mating structure at a rearward most end and the reamer at the forwardmost end,
   wherein the plurality of inserts include cutting surfaces at different axial positions relative to the axis of the material removal tool and at different radial positions relative to the axis of the material removal tool,
   wherein the cutting surfaces at different axial and radial positions are arranged at different angles to the axis,
   wherein at least one cutting surface on at least one insert is at an angle of about 45 degree relative to the axis,
   wherein the cutting surfaces of inserts at a first axial position overlap in an axial direction the cutting surfaces of inserts at a second axial position,
   wherein the plurality of inserts include, collectively, a plurality of cutting surfaces positioned sequentially in the axial direction relative to the axis from a forwardmost cutting surface to a rearwardmost cutting surface and positioned sequentially in the radial direction relative to the axis from an innermost cutting surface to an outermost cutting surface,
   wherein a first cutting surface of the plurality of cutting surfaces positioned sequentially in the axial direction relative to the axis extends past an effective intersection point with a second cutting surface of the plurality of cutting surfaces positioned sequentially in the axial direction, and
   wherein a first cutting surface is the forwardmost and innermost cutting surface and wherein a second cutting surface is the rearwardmost and outermost cutting surface.

2. The material removal tool of claim 1, wherein a third cutting surface is positioned, relative to the axis, axially and radially between the first cutting surface and the second cutting surface, and wherein the third cutting surface is at the angle of about 45 degree relative to the axis.

3. The material removal tool of claim 2, wherein each one of the plurality of inserts comprises the first cutting surface, the second cutting surface and the third cutting surface.

4. The material removal tool of claim 3, wherein the third cutting surface is contiguous with the first cutting surface and the second cutting surface.

5. The material removal tool of claim 2, wherein each one of the plurality of inserts consists essentially of the first cutting surface, the second cutting surface and the third cutting surface.

6. The material removal tool of claim 2, wherein the plurality of inserts includes two sets of at least two inserts arranged alternatingly on a circumferential surface of the insert housing, each insert in a first set having the first cutting surface and the second cutting surface, and each insert in a second set having the third cutting surface.

7. The material removal tool of claim 2, wherein the plurality of inserts includes sets of common insert-types arranged on a circumferential surface of the insert housing, each insert-type in a first set having the first cutting surface, each insert-type in a second set having the second cutting surface, and each insert-type in a third set having the third cutting surface.

8. The material removal tool of claim 7, wherein insert-types with different cutting surfaces are staggered around the circumference of the insert housing with the same insert-type being non-sequential circumferentially.

9. The material removal tool of claim 2, wherein the reduced diameter circumferential insert housing is a hub that is separable from a body of the material removal tool and includes a bore positioned over the holder and mated to the body.

10. The material removal tool of claim 9, wherein a radially extending surface of the hub mates to a complementary surface of the body.

11. The material removal tool of claim 10, wherein a one of the radially extending surface of the hub and the complementary surface of the body includes a pilot and wherein the other of the radially extending surface of the hub and the complementary surface of the material removal tool includes a receiver for the pilot.

12. The material removal tool of claim 11, wherein the pilot includes a biasing feature.

13. The material removal tool of claim 1, wherein inserts with common axial and radial positions and common angles are staggered around the circumference of the insert housing.

14. The material removal tool of claim 1, wherein the plurality of inserts are formed from a composition that includes cemented carbide or cubic boron nitride.

15. The material removal tool of claim 14, wherein the plurality of inserts are brazed to the insert housing.

16. A reduced diameter circumferential insert housing, comprising:
   a body with a bore;
   a plurality of inserts bonded thereto at a circumferential position of the body,
   wherein the plurality of inserts include cutting surfaces at different axial positions relative to an axis or the bore and at different radial positions relative to the axis of the bore,
   wherein the cutting surfaces at different axial and radial positions are arranged at different angles to the axis,
   wherein at least one cutting surface on at least one insert is at an angle of about 45 degree relative to the axis,
   wherein the cutting surfaces of inserts at a first axial position overlap in an axial direction the cutting surfaces of inserts at a second axial position,
   wherein the plurality of inserts include, collectively, a plurality of cutting surfaces positioned sequentially in the axial direction relative to the axis from a forwardmost cutting surface to a rearwardmost cutting surface and positioned sequentially in the radial direction relative to the axis from an innermost cutting surface to an outermost cutting surface, wherein a first cutting surface of the plurality of cutting surfaces positioned sequentially in the axial direction relative to the axis extends past an effective intersection point with a second cutting surface of the plurality of cutting surfaces positioned sequentially in the axial direction, and wherein a first cutting surface is the forwardmost and innermost cutting surface and wherein a second cutting surface is the rearwardmost and outermost cutting surface.

17. The insert housing of claim 16, wherein a third cutting surface is positioned, relative to the axis, axially and radially between the first cutting surface and the second cutting surface, and wherein the third cutting surface is at the angle of about 45 degree relative to the axis.

18. The insert housing of claim 17, wherein each one of the plurality of inserts consists essentially of the first cutting surface, the second cutting surface and the third cutting surface.

19. The insert housing of claim 17, wherein the plurality of inserts includes sets of common insert-types arranged on a circumferential surface of the insert housing, each insert-type in a first set having the first cutting surface, each insert-type in a second set having the second cutting surface, and each insert-type in a third set having the third cutting surface.

20. A method to remove material from a workpiece, the method comprising:
rotating a material removal tool mounted to a spindle of machine tool;
inserting a reamer into a guidehole of the workpiece; and
removing material from the workpiece by contacting a plurality of inserts of the material removal tool to the workpiece,
wherein the material removal tool includes:
a mating structure for attaching the material removal tool to the spindle of the machine tool,
a reduced diameter circumferential insert housing including the plurality of inserts bonded thereto, and
a holder, the reamer positioned in the holder and longitudinally extending therefrom along an axis of the material removal tool,
wherein the mating structure, the reduced diameter circumferential insert housing, the holder and the reamer are arranged axially along the axis with the mating structure at a rearwardmost end and the reamer at the forwardmost end,
wherein the plurality of inserts include cutting surfaces at different axial positions relative to the axis of the material removal tool and at different radial positions relative to the axis of the material removal tool,
wherein the cutting surfaces at different axial positions are arranged at different angles to the axis,
wherein at least one cutting surface on at least one insert is at an angle of about 45 degree relative to the axis,
wherein the cutting surfaces of inserts at a first axial position overlap in an axial direction the cutting surfaces of inserts at a second axial position,
wherein the plurality of inserts include, collectively, a plurality of cutting surfaces positioned sequentially in the axial direction relative to the axis from a forwardmost cutting surface to a rearwardmost cutting surface and positioned sequentially in the radial direction relative to the axis from an innermost cutting surface to an outermost cutting surface,
wherein a first cutting surface of the plurality of cutting surfaces positioned sequentially in the axial direction relative to the axis extends past an effective intersection point with a second cutting surface of the plurality of cutting surfaces positioned sequentially in the axial direction, and
wherein a first cutting surface is the forwardmost and innermost cutting surface and wherein a second cutting surface is the rearwardmost and outermost cutting surface.

21. The method of claim 20, comprising adjusting an axial position of the reduced diameter circumferential insert housing by a spacer placed between mating surfaces of the reduced diameter circumferential insert housing and a body of the material removal tool.

22. The method of claim 20, wherein removing material forms a valve stem seating surface in the workpiece, the valve stem seating surface including a stem surface, a top surface, and a joining surface.

23. The method of claim 20, wherein each insert has no more than one cutting surface and defines an insert-type, there are at least two separate cutting positions staggered around the circumference of the insert housing for each insert-type, and each individual insert in the insert-type having, relative to the axis, a common cutting surface axial and radial position and a common cutting surface angle.

24. The method of claim 20, wherein each insert has no more than two cutting surfaces and defines an insert-type, each individual insert in the insert-type having, relative to the axis, a common cutting surface axial and radial position and a common cutting surface angle, and wherein the inserts of any one insert-type are staggered around the circumference of the insert housing at separated cutting positions.

25. The method according to claim 20 or 21, wherein the cutting surface of each insert type correlates to one of a stem surface of a valve stem seating surface, a top surface of the valve stem seating surface, and a joining surface of the valve stem seating surface, and wherein at least one of a corner formed by the intersection of the stem surface and the joining surface and a corner formed by the intersection of the top surface and the joining surface is non-radiused.

26. The method according to claim 20, wherein a first cutting surface of the plurality of cutting surfaces positioned sequentially in the axial direction relative to the axis extends past an effective intersection point with a second cutting surface of the plurality of cutting surfaces positioned sequentially in the axial direction.

* * * * *